Figure 4:
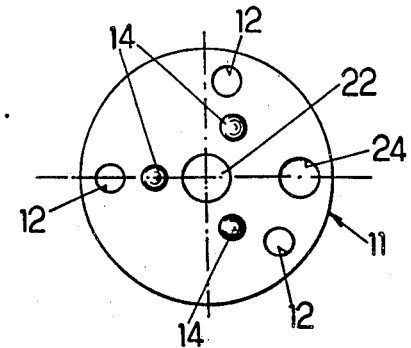

United States Patent [19]

Malvy et al.

[11] Patent Number: 4,659,244

[45] Date of Patent: Apr. 21, 1987

[54] DEVICE FOR RAPIDLY INTERLOCKING OR DISENGAGING, FOR ANTI-THEFT PURPOSES, THE STEERING WHEEL AND THE STEERING COLUMN OF A MOTOR VEHICLE

[76] Inventors: Michel Malvy, 848 Bd de Stalingrad, 94500 Champigny; Pierre Jalabert, 27 Route des Pyrénées, 11190 Couiza, both of France

[21] Appl. No.: 734,841

[22] Filed: May 16, 1985

[30] Foreign Application Priority Data

May 18, 1984 [EP] European Pat. Off. ........ 84401047.0

[51] Int. Cl.⁴ .............................................. F16D 1/00
[52] U.S. Cl. .......................................... 403/24; 403/1; 74/552
[58] Field of Search .................. 403/1, 24, 25; 74/552

[56] References Cited

U.S. PATENT DOCUMENTS

| 1,489,264 | 4/1924 | May ........................................ 74/552 |
| 1,591,268 | 7/1926 | Beck ....................................... 74/552 |
| 4,306,466 | 12/1981 | Coveney ............................ 74/552 X |

FOREIGN PATENT DOCUMENTS 986776 4/1951 France ................................. 74/552

Primary Examiner—Andrew V. Kundrat
Attorney, Agent, or Firm—Larson and Taylor

[57] ABSTRACT

A device for rapidly interlocking or disengaging for anti-theft purposes, the steering wheel and the steering column of a motor vehicle. The device includes:
- a base interlocked for rotation with the steering column.
- an intermediate connecting piece.
- a plate interlocked for rotation with the steering wheel.
- first rotational coupling mechanism provided between the base and the connecting piece for rapid coupling uncoupling of the base and the connecting piece together for rotation.
- second rotational coupling mechanism provided between the connecting piece and a plate for rapid coupling and decoupling of the connecting piece and the plate together for rotation and
- releasable assembly holding mechanism for maintaining the base, the connecting piece and the plate assembled axially, whereby the connecting piece may be readily positioned between the base and the plate (the steering wheel then being coupled for rotation to the steering column) or removed (the steering wheel, then being uncoupled from rotation with the steering column).

12 Claims, 4 Drawing Figures

DEVICE FOR RAPIDLY INTERLOCKING OR DISENGAGING, FOR ANTI-THEFT PURPOSES, THE STEERING WHEEL AND THE STEERING COLUMN OF A MOTOR VEHICLE

The present invention relates to a device for rapidly interlocking or disengaging, for anti-theft purposes, the steering wheel and the steering column of a motor vehicle.

Different devices of this kind are already known, also used for anti-theft purposes, which however have certain drawbacks. Most of these known devices are of a complex structure and construction thereof does not take into account requirements imposed by large scale manufacture and by a necessary simplicity of handling, which are at the base of the widespread use of this kind of device. In particular, some known devices are too complicated to handle for the average manual skill of most drivers, and especially women drivers, and some even require tools (such as a spanner) for fitting and removing the steering wheel, which obviously means that the operation is long and impractical.

Moreover, some known devices only provide, for ensuring the anti-theft function, rotational uncoupling for the steering wheel and the steering column, the steering wheel remaining mounted on the steering column and turning freely thereon; provision of the anti-theft function is not apparent from outside the vehicle and an attempted theft, for example forcing a lock or breaking a window of the vehicle, is not cut of the question, even if the effective theft cannot take place.

On the other hand, in some other known devices, provision of the anti-theft function involves removal of the steering wheel and the driver is practically forced to leave his vehicle and take the dismantled steering wheel with him, which is not always practical.

Finally, most of the known devices are adapted for the steering column of a given type of vehicle, and, for equipping the great diversity of vehicles at present available on the market, the manufacturer must produce as many particular devices as there exist different types of steering wheels.

The aim of the invention is essentially to overcome the above drawbacks and to propose a device which satisfies better the different requirements of practice than the prior devies and which, in particular, is of a simple but reliable structure, relatively inexpensive to manufacture, easy and rapid to handle, which leaves the user free to leave the steering wheel in position or to remove it when it is uncoupled from the steering column and which, finally, is readily adaptable to the different types of steering wheels used on the market without modifying the pre-existing electric circuits, connected to the controls disposed in or on the steering wheel.

To these ends, the device of the invention is essentially characterized by the fact that it comprises in combination:

a piece interlocked for rotation with the steering column,
an intermediate connecting piece,
a plate interlocked for rotation with the steering wheel,
first rotational coupling means, provided between the base and the connecting piece for coupling said base and said connecting piece together for rotation and allowing rapid coupling and decoupling,
second rotational coupling means, provided between the connecting piece and the plate for coupling said connecting piece and said plate for rotation, and
releasable assembly holding means for maintaining the base, the connecting piece and the plate assembled together axially, whereby the connecting piece may be readily positioned between the base and the plate (the steering wheel then being connected for rotation to the steering column) or removed (the steering wheel then being uncoupled from rotation with the steering column).

Figure 1:
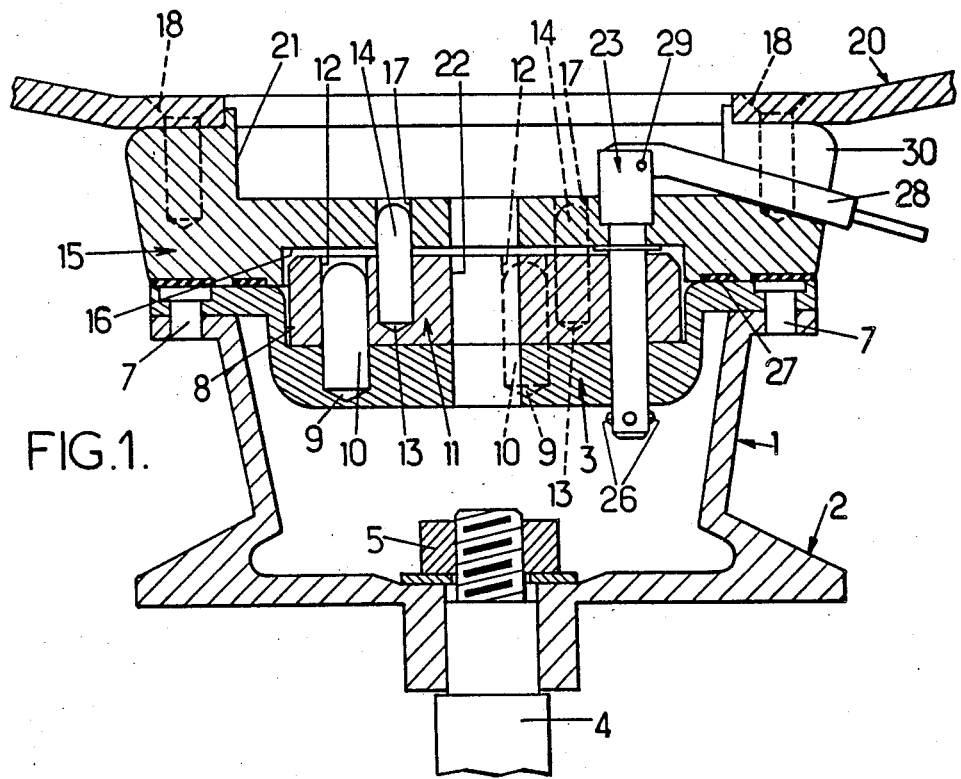
Figure 2:
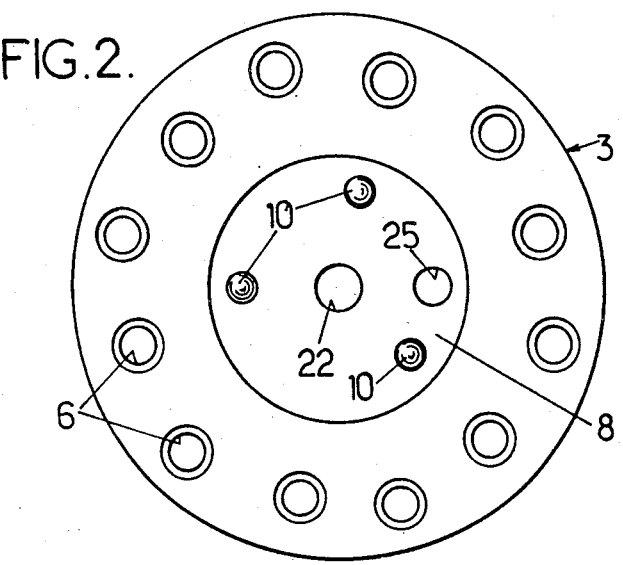
Figure 3:
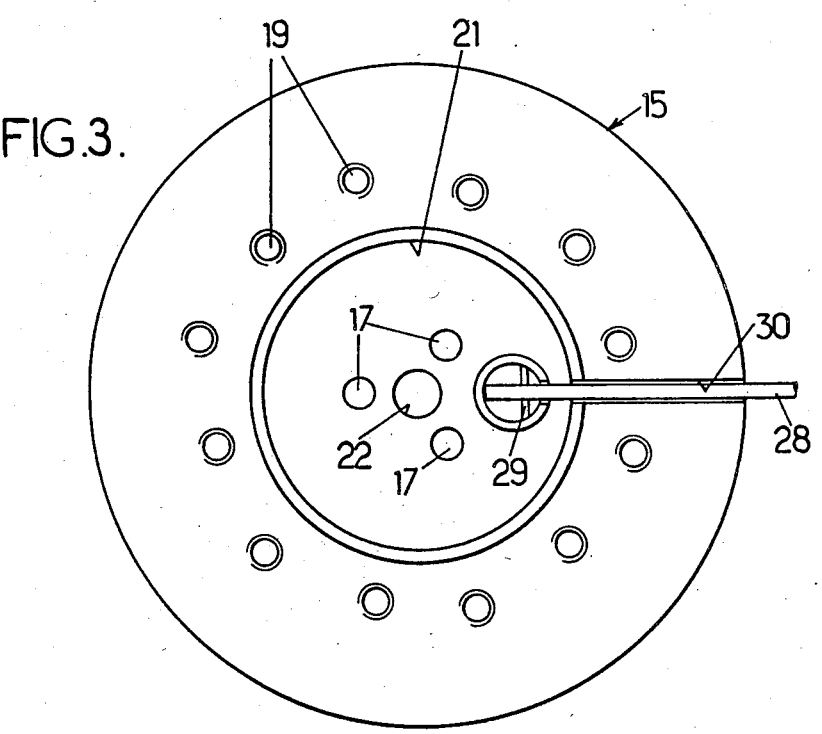

The invention will be better understood from reading the following detailed description of a preferred but in no wise limitative embodiment, in which reference is made to the accompanying drawings in which:

FIG. 1 is a diametrical vertical sectional view of a preferred embodiment of the invention; and FIGS. 2 to 4 are top views respectively of three essential component parts of the device of FIG. 1.

Referring essentially to FIG. 1, the device of the invention comprises a base 1, which, advantageously, is made from two parts, namely: a hub 2 and a support plate 3.

The hub 2 is fitted onto the free end of the steering column 4 and locked against rotation by any appropriated means currently used for this purpose (for example splines, not shown) and it is locked axially by a nut 5. Such a hub serves as an adaptor which must be shaped for mounting on the steering wheel of a given vehicle. Such adaptors are currently available commercially, for example for fitting so called "sport" steering wheels in the place of a series steering wheel.

The support plate 3 has substantially the same diameter as the upper part of hub 2 and it is provided with bores 6 spaced apart circumferentially in correspondance with the bores in the hub 2 and receiving screws, rivets or similar fixing means 7 for fixing plate 3 to hub 2.

As shown in FIG. 1 and FIG. 2, which shows a top view of plate 3, this plate has on its upper face a central circular recess 8 in the bottom of which are formed several bores 9 (3 in the example shown) in which vertically upward projecting fingers 10 are force fitted.

In recess of there is received an intermediate connecting piece 11 in the form of a relatively thick circular disk or connecting piece 11, having bores or housings 12 disposed opposite the fingers 10 and dimensioned so as to receive these latter in a sliding relation. Housings 12 open onto the upper face of connecting piece 11 and may, as shown, be through holes. Piece 11 also has other bores 13 formed in its upper face and in which are force fitted vertically upward projecting fingers 14.

Finally, a plate 15 is fitted on the assembly and has, formed in its lower face, a central circular recess 16 so that plate 15 rests on the support plate 3 by its peripheral portion whereas recesses 8 and 16 define a circular chamber in which the connecting piece 11 is housed. In the bottom of recess 16 are formed bores or housings 17 (which may open onto the opposite face) disposed opposite fingers 14 and dimensioned for receiving them in a sliding relation. On its upper face, plate 15 is provided with tapped holes 18, spaced apart circumferentially, for receiving screws or rivets or similar fixing means 19 for fixing the steering wheel 20 (only two spokes of which have been shown for simplifying FIG. 1). On its upper face, plate 15 may comprise another central circular recess 21 for housing auxiliary members (for example contacts for the control switch of the horn or warning device disposed on the steering wheel). FIG. 3 shows a top view of plate 15.

Plate 3, connecting piece 11 and plate 15 are provided with central axial bores defining together a passage 22, for example for electric wires (control of the warning means).

Furthermore, the axial assembly of plate 3, connecting piece 11 and plate 15 is obtained by means of a pin 23 with retractable balls 26 fixed on plate 15, in a radially off-centered position. The intermediate piece 11 and plate 3 are provided with mutually aligned bores respectively 24 and 25, in which is engaged the shank of the pin and balls 26, in a projecting position (see FIG. 1), bear on the lower face of the support plate 3. An annular support plate 3 and plate 15, ensure locking of the assembly.

Pin 23 comprises a lever 28 for controlling retraction of balls 26 (allowing the different parts 3 11 and 15 to be disassembled), which lever is pivotably mounted on a pin 29 and extends radially, through a groove 30 formed in plate 15, outwardly of this latter. Such a retractable ball pin is commercially available.

Disengagement of the steering wheel and the steering column is provided by lifting lever 28 so as to cause balls 26 to retract, pulling steering wheel 20 upwardly and removing the connecting piece 11, which the driver may keep in his pocket. The steering wheel then may be either replaced (it rotates freely on the steering column) or be stored elsewhere (the steering column visibly without its steering wheel being a dissuasion against breaking into the vehicle with a view to stealing it).

It will be noted that a foolproof means may be readily provided so that only the steering wheel of the vehicle can be fitted on the steering column. For this, the number and/or the dimension (particularly the diameter), and/or the positioning (radially and circumferential) of fingers 10 and housings 12 may be modified from one device to another. On the other hand fingers 14 may be disposed angularly with equidistant spacing.

As is evident and as it follows moreover already from what has gone before, the invention is in no wise limited to those of its modes of application and embodiments which have been more especially considered; it embraces, on the contrary, all variants thereof.

In particular, fingers 9 and housings 12 and/or fingers 14 and housings 17 may have any other orientation than the axial orientation shown. The pin may be disposed centrally. A lock may be provided for preventing lever 28 from being actuated and the steering wheel stolen. Pin 23 may be removable with respect to plate 15.

We claim:

1. An anti-theft device for rapidly disengaging and subsequently interlocking a steering wheel to a steering column of a motor vehicle, comprising:
   a base which is secured to the steering column for rotation therewith about a longitudinal axis;
   a plate which is secured to the steering wheel for rotation therewith;
   an intermediate connecting piece which is located axially between said base and said plate;
   a first coupling means for rotatably coupling and decoupling said connecting piece and said base such that said connecting piece is rapidly coupled to or decoupled from said base;
   a second coupling means for rotatably coupling and decoupling said connecting piece and said plate such that said connecting piece is rapidly coupled to or decoupled from said plate; and
   a releasable holding means for releasably holding said connecting piece axially between said base and said plate with said base coupled to said connecting piece by said first coupling means and with said plate coupled to said connecting piece by said second coupling means whereby the steering wheel is coupled for rotation with the steering column and whereby when said releasable holding means is released said connecting piece is rapidly removable axially from between said base and said plate.

2. A device as claimed in claim 1 wherein said first coupling means comprises a first projecting finger projecting from one of said base and said connecting piece and a corresponding first bore in which said first finger is received provided in the other of said base and said connecting piece; and wherein said second coupling means comprises a second projecting finger projecting from one of said plate and said connecting piece and a corresponding second bore in which said second finger is received provided in the other of said plate and said connecting piece.

3. A device as claimed in claim 2 wherein said first finger projects from said base and said first bore is located in said connecting piece.

4. A device as claimed in claim 2 wherein said base and said connecting piece include respective mating faces which extend in a direction perpendicular to the longitudinal axis, said mating faces being located adjacent a respective one of said first bore and said first finger; and wherein said first bore and said first finger extend perpendicular to the respective said mating face adjacent thereto.

5. A device as claimed in claim 2 wherein said second finger projects from said connecting piece said second bore is located in said plate.

6. A device as claimed in claim 2 wherein said plate and said connecting piece include respective mating faces which extend in a direction perpendicular to the longitudinal axis, said mating faces being located adjacent a respective one of said second bore and said second finger; and wherein said second bore and said second finger extend perpendicular to the respective said mating face adjacent thereto.

7. A device as claimed in claim 2 wherein there are a plurality of first fingers and corresponding first bores, said plurality first fingers and said plurality of first bores being arranged is one of a plurality of unique configurations such that only a base having a particular unique configuration and a connecting piece having a corresponding particular unique configuration are coupled together.

8. A device as claimed in claim 2 wherein there are a plurality of first fingers and corresponding first bores, each said first finger and corresponding said first bore having one of a plurality of particular longitudinal dimensions such that only a unique set of particular dimensioned plurality of said first fingers are coupled to a corresponding set of particular dimensioned plurality of said first bores.

9. A device as claimed in claim 1 wherein said base and said plate engage one another axially and form an axial housing therebetween in which said connecting piece is located.

10. A device as claimed in claim 2 wherein said base comprises a hub, a means for attaching said hub to the steering column, a support plate from which said first finger projects, and a means for attaching said support plate to said hub.

11. A device as claimed in claim 1 wherein said holding means comprises a longitudinal bore provided through said plate, connecting piece, and base, and a retractable ball pin which passes through said longitudinal bore.

12. A device as claimed in claim 11 wherein said longitudinal bore is eccentrically located with respect to the longitudinal axis, and wherein a central longitudinal bore is provided through said plate, connecting piece, and base which is coaxial with the longitudinal axis and through which control connections are passed.

* * * * *